June 22, 1965 R. M. WILMOTTE 3,191,043
PHOTOSENSITIVE PULSE COUNTER CHAIN
Filed Sept. 8, 1959
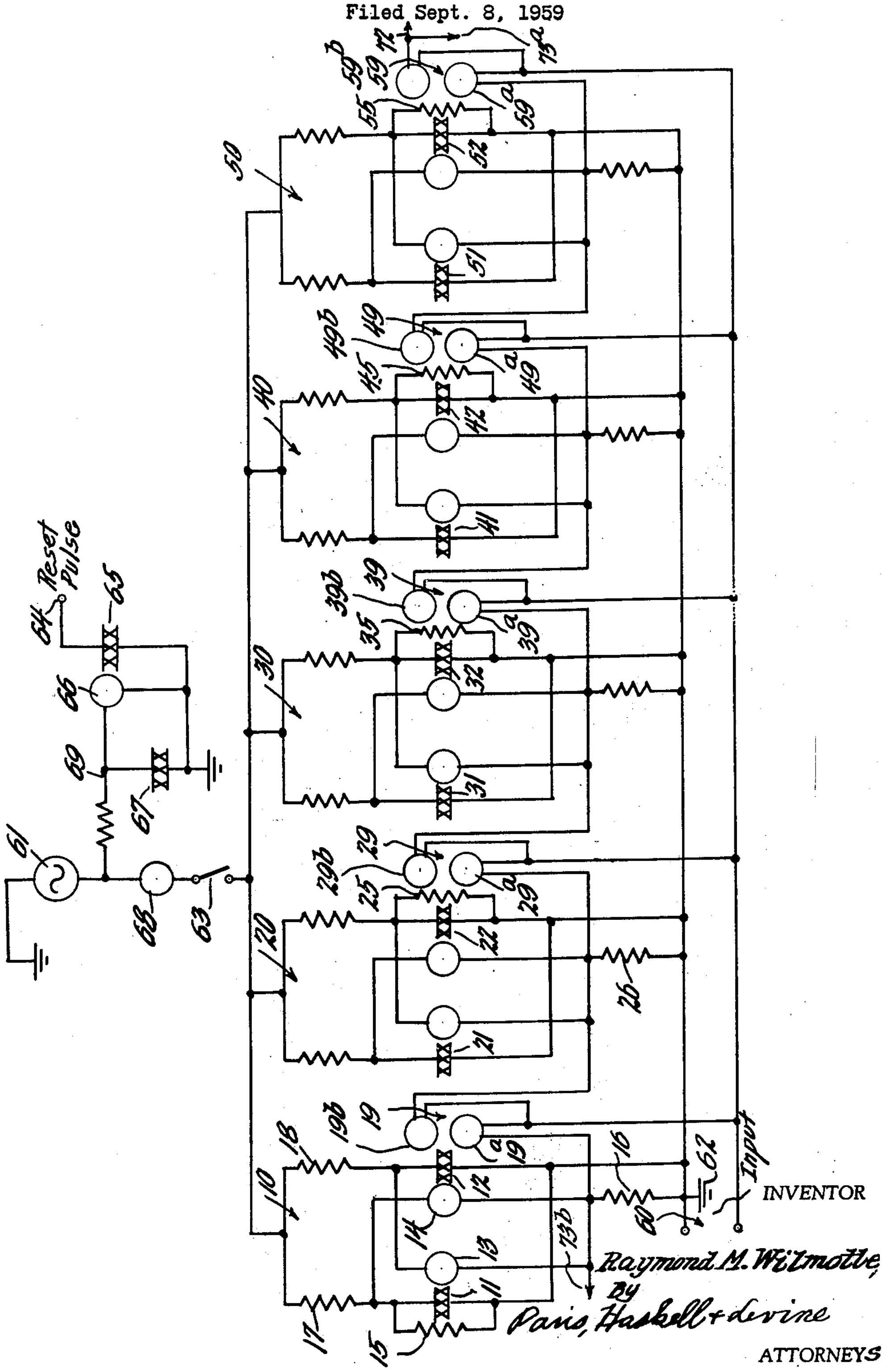
INVENTOR
Raymond M. Wilmotte,
By
Paris, Haskell + Levine
ATTORNEYS 3,191,043
PHOTOSENSITIVE PULSE COUNTER CHAIN
Raymond M. Wilmotte, Princeton, N.J.
(4301 Massachusetts Ave. NW., Washington, D.C.)
Filed Sept. 8, 1959, Ser. No. 838,454
14 Claims. (Cl. 250—209)

The present invention relates to electrical counter chain circuits, and more particularly is concerned with such circuits wherein the basic components are couples of photoresponsive elements and variable light sources. The present invention is related to my copending application S.N. 620,831, filed November 7, 1956, and copending application S.N. 607,770, filed September 4, 1956, by myself and Robert L. Carnine, jointly.

In their preferred, and what is presently considered their most practical embodiments for the present purposes, the aforementioned couples comprise photoconductors, such as cadmium sulfide crystals, as the photoresponsive elements, and light transmitting electroluminescent condensers, or cells, as the variable light sources. Photoconductors in the form of suitably activated cadmium sulfide crystals are well known, and such elements can be readily formed possessing relatively wide ranges of photoresponse and time characteristics to illumination. Light transmitting electroluminescent condensers are also well known, and in their more usual form possess the property of emitting light in proportion to the magnitude of A.C. voltage impressed thereacross. These electroluminescent condensers also have the property of a threshold voltage, below which the condensers remain substantially dark or non-luminant.

In accordance with the present invention, by appropriate electrical and luminance coupling of electric signal responsive variable light sources and photoresponsive elements, such as the types above referred to, circuits can be formed broadly functionally equivalent to conventional counter chains, such as vacuum tube and magnetic counter chains.

The counter chain of the present invention comprises a plurality of bi-stable flip-flop units or stages appropriately interrelated or coupled to perform the logical function of counting sequential input signals or pulses, which is effected by stepping a selected stage condition along the chain in sequence with the input pulses. The flip-flop or scale-of-two circuit of each stage is formed from two variable light sources and two photoresponsive elements appropriately coupled to said light sources optically and electrically, to impart to the unit or stage two stable states—a "0" state with a first of the light sources luminant and the other non-luminant, and a "1" state with said first light source non-luminant and said other luminant. Each such stage is adapted to be switched from its existing stable state to its other stable state upon the application of each input pulse thereto. Further, appropriate photoresponsive control circuits are associated with each stage so as to couple any given input pulse applied to the counter chain input into only that stage or those stages denoting a "1" state and that stage or those stages immediately succeeding the "1" stage or stages, to reverse the states of these stages to which the input is applied. Thus, in accordance with usual counter chain operation, successive pulses applied to the chain input cause the state of "1," which may be preestablished in one or more stages, to step down the chain through the successive stages, one stage at a time for each said input pulse.

It is accordingly one object of the present invention to provide a novel counter chain circuit.

Another object of the present invention is to provide such a circuit utilizing electric signal responsive variable light sources coupled with photoresponsive elements as the basic components of the circuit.

Another object of the present invention is to provide such a circuit utilizing electroluminescent condensers or cells and photoconductors as the basic components of the circuit.

Still another object of the present invention is to provide a circuit which is broadly functionally equivalent to conventional counter chains, wherein photoconductors and light transmitting electroluminescent condensers are utilized as the basic components of the circuit.

And an additional object of the present invention is to provide a counter chain utilizing binary flip-flops for its several stages, and in which the basic elements or components of the circuit are photoresponsive elements and variable light sources electrically and optically coupled together, particularly where said photoresponsive elements are solid state photoconductors, and said light sources are solid state electroluminescent cells or capacitors.

Other objects and advantages of the present invention will become apparent to those skilled in the art from a consideration of the following detailed description of an exemplary specific embodiment thereof, had in conjunction with the accompanying drawing which is a schematic presentation of this embodiment.

Referring to the drawing, the counter chain there illustrated comprises four identical binary stages 10, 20, 30, 40, and 50. Binary stage 10 comprises two arms in electrical parallel relationship between an A.C. bias source 61 and ground 62. One arm includes the electrical series elements of resistor 17 and electroluminescent cell or capacitor 11, and the other arm includes the electrical series elements of resistor 18 and electroluminescent cell or capacitor 12. In addition photoconductor 14 is connected in electrical parallel relationship with cell 11 with respect to the bias source 61, and is optically coupled to cell 12. Correspondingly, photoconductor 13 is connected in electrical parallel relationship with cell 12 with respect to the bias source 61, and is optically coupled to cell 11. The network thus far described for stage 10 constitutes a flip-flop circuit, as will become apparent from the subsequent description of its operation. In order to introduce a prescribed or planned asymmetry into this flip-flop circuit, a resistor 15 is connected across cell 11.

Thus, with regard to stage 10, when a bias voltage from source 61 is initially applied to the circuit, as by closing switch 63 (assuming photoconductor 68 to be in a low resistance state, as will be subsequently explained), stage 10 assumes the stable state of cell 12 luminant and cell 11 extinguished. This result is accomplished by choosing the parameters of the circuit so that when switch 63 is initially closed, the voltages across cells 11 and 12 from the bias source 61 are both in excess of their threshold values. However, because of the unbalance caused by resistor 15, the voltage across cell 12 is greater than that across cell 11, hence cell 12 luminesces more brilliantly than cell 11. As these cells 11 and 12 luminesce, their respective optical couplings with photoconductors 13 and 14 cause the resistances of these photoconductors to decrease. Since cell 12 is luminescing more brilliantly than cell 11, photoconductor 14 tends to decrease to a lower resistance and faster than photoconductor 13. As a result, the decrease in resistance of photoconductor 14 causes the voltage applied across cell 11 to drop below its threshold value, and cell 11 becomes non-luminant. The optical coupling between cell 11 and photoconductor 13 initially has a similar effect on cell 12, but since cell 12 starts from a more brilliant or higher voltage condition than cell 11, cell 12 does not become extinguished and the stage 10 soon reaches the stable state of cell 12 luminant and cell 11 non-luminant or extinguished. With cell 11 extinguished, photoconductor 13 soon attains its full impedance value, and cell 12 attains its full luminance under the bias voltage. This stable state of the binary stage 10 is herein identified as the "1" state.

Each of the stages 20, 30, 40, and 50 are identical to stage 10 except that the unbalancing resistor in each such stage is connected across the opposite cell than is the case in stage 10; i.e. resistor 25 is connected across cell 22, resistor 35 is connected across cell 32, resistor 45 is connected across cell 42, and resistor 55 is connected across cell 52. From the description of stage 10, it is therefore apparent that the application of the bias voltage from source 61 causes stage 20 to assume the stable condition of cell 21 luminant and cell 22 non-luminant, stage 30 to assume the stable condition of cell 31 luminant and cell 32 non-luminant, stage 40 to assume the stable condition of cell 41 luminant and cell 42 non-luminant, stage 50 to assume the stable condition of cell 51 luminant and cell 52 non-luminant. Stages 20, 30, 40, and 50 are therefore in the stable condition herein referred to as the "0" state.

The input of pulses to the counter chain is effected through input terminals 60. An input pulse at 60, when passed for example by photoconductor 19*a*, as will be explained subsequently, is applied to stage 10 across resistor 16. Considering stage 10 to be in its stable state "1" above-defined, cell 12 is luminant and illuminating photoconductor 14, while cell 11 is non-luminant and hence photoconductor 13 is not luminated. Photoconductor 14 is therefore a relatively low impedance and photoconductor 13 is a relatively high impedance. Since the input pulse is coupled to each of said cells through its respective photoconductor in electric series with it with respect to the input source (series circuit 60, 19*a*, 13, 12, to ground, and series circuit 60, 19*a*, 14, 11, to ground), a much greater voltage from the input pulse is passed by photoconductor 14 and applied across cell 11 than is passed by photoconductor 13 and applied across cell 12. The input pulse should be of sufficient value to render cell 11 substantially more luminant than cell 12. The duration of this input pulse is timed in accordance with the time characteristics of the photoconductors, to terminate at a time that renders photoconductor 13 more conductive than photoconductor 14 as a result of the input pulse. This residual unbalance in the flip-flop circuit overrides the unbalance due to resistor 15, and results in a dominant luminance of cell 11 over cell 12, and the establishment of stable state "0" in stage 10, with cell 11 fully luminant from the bias source 61 and cell 12 extinguished, it being shunted by the low impedance of the illuminated photoconductor 13. From the foregoing it is apparent that if an input pulse is applied across resistor 16 when stage 10 is in the "0" state, because photoconductor 13 is illuminated by cell 11 and hence is a lower impedance than photoconductor 14, cell 12 will be caused to luminesce more brilliantly than cell 11. Accordingly, the luminance of cell 12 will dominate, and the bistable circuit will be caused to switch to the stable state "1."

It is therefore apparent that successive input pulses applied across the flip-flop input resistor 16 will cause stage 10 to switch between its "0" and "1" states with each pulse. Similarly, successive input pulses applied across the flip-flop input resistors 26, 36, 46, and 56 will cause the corresponding stages 20, 30, 40, and 50 to switch between their "0" and "1" states with each pulse so applied.

Referring to the control circuit 19 between stage 10 and stage 20, it comprises the photoconductors 19*a* and 19*b* optically coupled to the cell 12. Photoconductor 19*a* is interposed in electrical series between counter input 60 and flip-flop input resistor 16, while photoconductor 19*b*, in parallel with 19*a*, is interposed in electrical series between counter input 60 and flip-flop input resistor 26. At the time stage 10 was in the "1" state and an input pulse was applied to the counter input 60, as above-described, cell 12 was originally luminant. Accordingly photoconductor 19*a* was a relatively low resistance, and the input pulse was passed to resistor 16 with sufficient amplituude to effect a switch in state of this stage. At the same time, since photoconductor 19*b* was also a relatively low resistance, the same input pulse is passed to resistor 26 of stage 20 with sufficient amplitude to effect a switch in state of this stage, also. However, when stage 10 is in the "0" state, cell 12 does not illuminate photoconductors 19*a* and 19*b*, and accordingly input pulses at 60 are not passed by these photoconductors with sufficient magnitude to affect stages 10 and 20. Considering, however, that while stage 10 is in the "0" state stage 20 is in the "1" state, because of illumination of photoconductors 29*a* and 29*b* by cell 22, an input pulse at 60 will be coupled through photoconductor 29*a* with sufficient magnitude to switch stage 20. This pulse would of course also be coupled through photoconductor 29*b* into stage 30 with sufficient magnitude to switch that stage from one state to the other.

Thus, with a plurality of identical flip-flop binary stages 10, 20, 30, 40, and 50, each similarly connected to a bias voltage source 61, the initial condition of each stage, as determined by the planned asymmetry effected by resistors 15, 25, 35, 45, and 55, is established with stage 10 in the stable "1" state and all the other stages in the stable "0" state, with cells 12, 21, 31, 41 and 51 luminant, and cells 11, 22, 32, 42, and 52 non-luminant. The first input pulse at 60 is effectively coupled by illuminated photoconductors 19*a* and 19*b* of control circuit 19 to stages 10 and 20 only, causing stage 10 to switch from the "1" state to the "0" state, and stage 20 to switch from the "0" state to the "1" state. Since the photoconductors of control circuits 29, 39, 49, and 59 had not been illuminated at the time of application of the first input pulse, this input pulse is not effectively coupled to stages 30, 40, or 50. With illumination of photoconductors 29*a* and 29*b* of control circuit 29 by cell 22, the second input pulse at 60 is effectively applied only to stage 20 and stage 30, causing stage 20 to return to the "0" state, and stage 30 to assume the "1" state. The third pulse in at 60 is effectively applied to stages 30 and 40 through the illuminated photoconductors 39*a* and 39*b* of control circuit 39. Stage 30 is thus returned to "0" state and stage 40 is switched to the "1" state. Hence, the fourth pulse in at 60 is applied to stages 40 and 50 through the illuminated photoconductors 49*a* and 49*b* of control circuit 49, causing stage 40 to switch to the "0" state and stage 50 to assume the "1" state. The fifth pulse in at 60 therefore causes stage 50 to revert to the "0" state, since this pulse is effectively coupled by photoconductor 59*a* to the input resistor 56 for this stage. At the same time, because of the illumination of photoconductor 59*b*, an output pulse may be obtained at 72 to effect one step in the next counter chain if desired, and the same pulse may be coupled by lead 73*a* coupled to lead 73*b* back to the input resistor 16 of stage 10, if ring counter chain operation is desired.

In the foregoing description an input pulse at 60 was coupled to the appropriate stages on the basis of the stage having a "1" state immediately prior to the input pulse. Since another stage is immediately switched to the "1" state as a result thereof, it is understood that the response time of the control circuits to illumination and the duration of an input pulse are related so that the input pulse terminates before the next control circuit is rendered responsive.

The counter chain may at any time be reset to its zero state, i.e. stage 10 in the "1" state and stages 20, 30, 40, and 50 in the "0" state, by opening switch 63 to cut off the bias voltage supply 61 long enough to permit all the cells and photoconductors to attain their non-energized state, and then closing the switch. The reapplication of the bias voltage results in the circuit responding in accordance with its planned asymmetry of the above-stated zero state. Resetting by switch 63 can of course be effected without photoconductor 68 in the circuit. With this photoconductor in the circuit, reset control by switch 63 is dependent upon photoconductor 68 being maintained in an illuminated low impedance state, as is obtained by electroluminescent cell 67 optically coupled to photoconductor 68.

Photoconductor 68 in series with the bias voltage source 61 can also function as a switch to effect resetting of the chain in response to an electrical reset pulse applied at reset input 64. Normally, no reset pulse is applied at 64, so cell 65 is non-luminant, photoconductor 66 optically coupled thereto is not illuminated and hence is a high resistance, whereby the voltage at 69 is sufficient to render cell 67 luminant. As indicated, luminance of cell 67 is applied to photoconductor 68 to render this element a relatively low impedance and result in application of a normal bias voltage to the counter chain. However, upon the application of a reset pulse to reset input 64, cell 65 luminesces, illuminating photoconductor 66, so that its resultant low resistance shunts and thereby extinguishes cell 67. With the extinguishment of cell 67, photoconductor 68 becomes a high resistance, thereby effectively cutting off the bias voltage to the counter chain, and causing all the elements of the chain to revert to their non-energized state. Upon termination of the reset pulse, cell 65 becomes extinguished, causing photoconductor 66 to regain its non-illuminated high impedance, as a result of which cell 67 again luminesces under the excitation of the bias voltage causing photoconductor 68 to become a low impedance. Thus the bias potential is again effectively applied to the counter chain, and the chain assumes the zero state as required by its planned asymmetry.

Accordingly, by the present invention there is provided a counter chain comprised of a plurality of binary flip-flop stages with coupling circuits interrelating the several stages, to provide a count, by stepwise response of the chain, of the number of pulses applied to the input of the counter. The stages and coupling circuits of this counter chain are formed from variable light sources and photoresponsive elements electrically and optically coupled to perform the binary operations of the several stages and the stepping function of the stage coupling circuits. Having presented one specific exemplary embodiment of the invention, it is understood that the scope of the invention is not limited thereto, for changes, modifications, and variations will be apparent to those skilled in the art; and such changes, modifications, and variations as are embraced by the spirit and scope of the appended claims are contemplated as within the purview of the present invention.

What is claimed is:

1. A pulse counter chain comprising a plurality of stages for registering the number of electrical signal pulses applied thereto; each stage including a bi-stable circuit cyclically operable between a first and a second stable state, and an input means for each said circuit; control means in combination with each two successive stages interrelating said two stages; and electrical signal pulse input means for the counter chain including means for simultaneously coupling each signal pulse applied thereto in parallel to each said control means; each said circuit comprising voltage responsive variable light means and photoresponsive means electrically and optically coupled to said light means; said light means and photoresponsive means of each said circuit cooperating in response to successive input signals applied to the respective input means to effect said cyclical operation, one cycle of operation for each pair of input signals applied to said respective input means; said first and second stable states being defined by different states of said light means; and each said control means including means optically coupled with said light means of one of its respective two stages for coupling a counter chain input signal pulse to the input means of both its respective two stages, only when said one stage is in said second stable state at the time of application of the last-mentioned input signal, and for otherwise blocking said counter chain input signal from the input means of both and respective two stages.

2. A counter chain as set forth in claim 1, and further including means cooperating with said bi-stable circuits for causing at least one of said circuits to assume said second stable state, and the remaining of said circuits to assume said first stable state, upon initial energization of said circuits.

3. A counter chain as set forth in claim 2, wherein said optically coupled means of each control means comprises photoresponsive means.

4. A counter chain as set forth in claim 3, wherein said photoresponsive means of each control means comprises a first photoresponsive element coupling the chain input means to the input means for one of said circuits and a second photoresponsive element coupling the chain input means to the input for the other of said circuits associated with the respective control means, said elements effectively isolating both of their respective bi-stable circuits from said chain input means and from each other when said one stage is in said first stable state.

5. A pulse counter chain comprising a plurality of stages for registering the number of electrical signal pulses applied thereto; each stage including a bi-stable circuit cyclically operable between a first and a second stable state, and an input means for each said circuit; control means in combination with each two successive stages interrelating said two stages; and electrical signal pulse input means for the counter chain including means for simultaneously coupling each signal pulse applied thereto in parallel to each said control means; each said circuit comprising two voltage responsive variable light sources and at least one photoresponsive element electrically coupled to one light source and optically coupled to the other light source; said light sources and photoresponsive element of each said circuit cooperating in response to successive input signals applied to the respective input means to effect said cyclical operation, one cycle of operation for each pair of input signals applied to said respective input means; said first and second stable states being defined by different states of said light sources; and each said control means including means optically coupled with one of said light sources of one of its respective two stages for coupling a counter chain input signal pulse to the input means of both its respective two stages, only when said one stage is in said second stable state at the time of application of the last-mentioned input signal, and for otherwise blocking said counter chain input signal from the input means of both said respective two stages.

6. A counter chain as set forth in claim 5, and further including means cooperating with said bi-stable circuits for causing at least one of said circuits to assume said second stable state, and the remaining of said circuits to assume said first stable state, upon initial energization of said circuits.

7. A counter chain as set forth in claim 6, wherein said optically coupled means of each control means comprises photoresponsive means.

8. A counter chain as set forth in claim 7, wherein said photoresponsive means of each control means comprises a first photoresponsive element coupling the chain input means to the input means for one of said circuits and a second photoresponsive element coupling the chain input means to the input for the other of said circuits associated with the respective control means, said elements effectively isolating both of their respective bi-stable circuits from said chain input means and from each other when said one stage is in said first stable state.

9. A pulse counter chain comprising a plurality of stages for registering the number of electrical signal pulses applied thereto; each stage including a bi-stable circuit cyclically operable between a first and a second stable state, and an input means for each said circuit;

control means in combination with each two successive stages interrelating said two stages; and electrical signal pulse input means for the counter chain including means for simultaneously coupling each signal pulse applied thereto in parallel to each said control means; each said circuit comprising two voltage responsive variable light sources and two photoresponsive elements; one element being connected electrically across one source and optically coupled with the other source, the other element being connected electrically across said other source and optically coupled with said one source; said light sources and photoresponsive elements of each said circuit cooperating in response to successive input signals applied to the respective input means to effect said cyclical operation, one cycle of operation for each pair of input signals applied to said respective input means; said first and second stable states being defined by different states of said light sources; and each said control means including photoresponsive means coupled with one of said light sources of one of its respective two stages for coupling a counter chain input signal pulse to the input means of both its respective two stages, only when said one stage is in said second stable state at the time of application of the last-mentioned input signal, and for otherwise blocking said counter chain input signal from the input means of both said respective two stages.

10. A counter chain as set forth in claim 9, and further including means cooperating with said bi-stable circuits for causing at least one of said circuits to assume said second stable state, and the remaining of said circuits to assume said first stable state, upon initial energization of said circuits.

11. A counter chain as set forth in claim 10, wherein said photoresponsive means of each control means comprises a first photoresponsive element coupling the chain input means to the input means for one of said circuits and a second photoresponsive element coupling the chain input means to the input for the other of said circuits associated with the respective control means, said elements effectively isolating both of their respective bi-stable circuits from said chain input means and from each other when said one stage is in said first stable state.

12. A pulse counter chain comprising a plurality of stages for registering the number of electrical signal pulses applied thereto; each stage including a bi-stable circuit cyclically operable between a first and a second stable state, and an input means for each said circuit;

and a control means in combination with each two successive stages interrelating said two stages; and input electrical signal pulse means for the counter chain including means for simultaneously coupling each signal pulse applied thereto in parallel to each said control means; each said circuit comprising voltage responsive variable light means responsive to successive input signals applied to the respective circuit input means to effect said cyclical operation, one cycle of operation for each pair of input signals applied to said respective input means; said first and second stable states being defined by different states of said light means; and each said control means including photoresponsive means optically coupled with said light means of one of its respective two stages for coupling a counter chain input signal pulse to the input means of both its respective two stages, only when said one stage is in said second stable state at the time of application of the last-mentioned input signal, and for otherwise blocking said counter chain input signal from the input means of both said respective two stages.

13. A counter chain as set forth in claim 12, and further including means cooperating with said bi-stable circuits for causing at least one of said circuits to assume said second stable state, and the remaining of said circuits to assume said first stable state, upon initial energization of said circuits.

14. A counter chain as set forth in claim 13, wherein said photoresponsive means of each control means comprises a first photoresponsive element coupling the chain input means to the input means for one of said circuits and a second photoresponsive element coupling the chain input means to the input for the other of said circuits associated with the respective control means, said elements effectively isolating both of their respective bi-stable circuits from said chain input means and from each other when said one stage is in said first stable state.

References Cited by the Examiner

UNITED STATES PATENTS

| | | | |
|---|---|---|---|
| 2,727,683 | 12/55 | Allen et al. | 250—209 X |
| 2,900,522 | 8/59 | Reis | 250—213 X |
| 2,985,763 | 5/61 | Ress | 250—208 |
| 3,107,301 | 10/63 | Willard | 250—214 X |

RALPH G. NILSON, *Primary Examiner.*

RICHARD M. WOOD, *Examiner.*